US012292772B2

(12) United States Patent
Salvadore et al.

(10) Patent No.: US 12,292,772 B2
(45) Date of Patent: May 6, 2025

(54) LOCAL POWER STORAGE AUTOMATION

(71) Applicant: Dell Products L.P., Round Rock, TX (US)

(72) Inventors: James R. Salvadore, Amherst, NH (US); Jimmy P. Nyhan, Riverstick (IE); Arieh Don, Newton, MA (US)

(73) Assignee: DELL PRODUCTS L.P., Round Rock, TX (US)

( * ) Notice: Subject to any disclaimer, the term of this patent is extended or adjusted under 35 U.S.C. 154(b) by 119 days.

(21) Appl. No.: 18/354,846

(22) Filed: Jul. 19, 2023

(65) Prior Publication Data
US 2025/0028374 A1   Jan. 23, 2025

(51) Int. Cl.
G06F 1/00 (2006.01)
G05F 1/66 (2006.01)
G06F 1/26 (2006.01)
H02J 3/00 (2006.01)
H02J 3/38 (2006.01)

(52) U.S. Cl.
CPC ............ G06F 1/263 (2013.01); G05F 1/66 (2013.01); H02J 3/003 (2020.01); H02J 3/381 (2013.01)

(58) Field of Classification Search
CPC .. G06F 1/263; G05F 1/66; H02J 3/003; H02J 3/381
See application file for complete search history.

(56) References Cited

U.S. PATENT DOCUMENTS

| 10,535,998 B2* | 1/2020 | Epel ................... G05B 13/048 |
| 2009/0119233 A1* | 5/2009 | Dunagan ............... G06Q 50/06 |
| | | 705/412 |
| 2009/0187782 A1* | 7/2009 | Greene .................. G06Q 10/00 |
| | | 713/340 |
| 2013/0086404 A1* | 4/2013 | Sankar .................. G06Q 50/06 |
| | | 713/320 |
| 2018/0082224 A1* | 3/2018 | Leslie ....................... G06F 9/50 |
| 2019/0036340 A1* | 1/2019 | Meeker .................... H02J 3/007 |
| 2019/0258307 A1* | 8/2019 | Shaikh ................... G06F 1/3206 |

* cited by examiner

Primary Examiner — Xuxing Chen
(74) Attorney, Agent, or Firm — Amin, Turocy & Watson, LLP

(57) ABSTRACT

Local power storage automation (e.g., using a computerized tool), is enabled. For example, a system can comprise: a processor and a memory that stores executable instructions that, when executed by the processor, facilitate performance of operations, comprising: based on historical power consumption data applicable to a data center rack, determining a predicted future power consumption by the data center rack, determining energy resource data of an energy resource available for consumption by the data center rack, wherein the energy resource data comprises energy unit cost, energy transfer rate, and usage limit applicable to the energy resource, and based on the predicted future power consumption by the data center rack and the energy resource data, and based on a defined power criterion being determined to be satisfied, powering the data center rack via the energy resource.

20 Claims, 10 Drawing Sheets

LOCAL POWER STORAGE AUTOMATION

BACKGROUND

Data centers have evolved significantly over the last thirty years and have gone through periods of centralization and de-centralization. Recent trends over the last ten years have led to the growth of "cloud providers." Cloud providers have spent billions of dollars deploying and expanding their data centers to account for increased business as corporations move some or all their IT operations to these remote facilities. These cloud data center facilities have grown exceptionally large, with some being over two-million square feet. The expansion of these data centers has often employed a cookie-cutter approach of deploying components in rack architectures, which are custom built and designed by the cloud provider to deliver a specific amount of work performed per amount of energy consumed.

Although these rack architectures are, in theory, designed to be energy efficient, data centers have rapidly expanded by deploying more and more racks, thereby rapidly increasing their overall total power consumption requirements. The rising costs of energy has placed the power consumption of these data centers in the cross hairs of both utility providers and local governments, threatening their future growth and profitability with increased regulations and soaring utility costs.

The above-described background relating to data centers is merely intended to provide a contextual overview of some current issues and is not intended to be exhaustive. Other contextual information may become further apparent upon review of the following detailed description.

DETAILED DESCRIPTION

Figure 1:
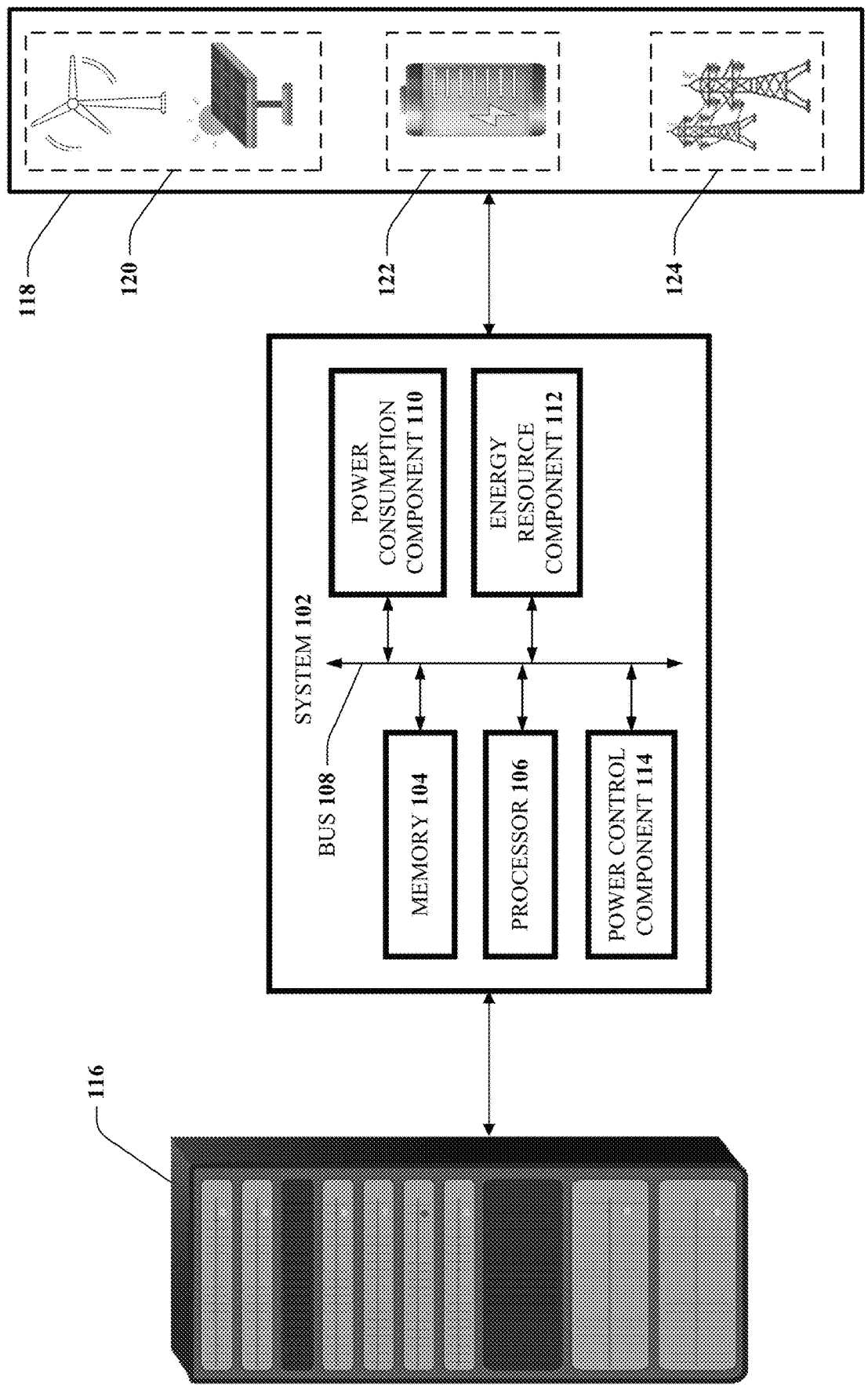
FIG. 1 is a block diagram of an exemplary system in accordance with one or more embodiments described herein.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

As alluded to above, data center racks can be improved in various ways, and various embodiments are described herein to this end and/or other ends. The disclosed subject matter relates to data centers and data center racks and, more particularly, to local power storage automation.

According to an embodiment, a system can comprise a processor, and a memory that stores executable instructions that, when executed by the processor, facilitate performance of operations, comprising based on historical power consumption data applicable to a data center rack, determining a predicted future power consumption by the data center rack, determining energy resource data of an energy resource available for consumption by the data center rack, wherein the energy resource data comprises energy unit cost, energy transfer rate, and usage limit applicable to the energy resource, and based on the predicted future power consumption by the data center rack and the energy resource data, and based on a defined power criterion being determined to be satisfied, powering the data center rack via the energy resource.

In various embodiments, the energy resource can be among a specified group of energy resources available for consumption by the data center rack.

In various embodiments, the above operations can further comprise, using machine learning applied to past energy resources and past energy unit prices, determining the defined power criterion.

In various embodiments, the energy resource can comprise an energy storage device. In this regard, the defined power criterion can comprise a state of charge of the energy storage device. In further embodiments, the energy resource can comprise a renewable energy resource. In additional embodiments, the energy resource can comprise electrical grid power. In this regard, the defined power criterion can be a first defined power criterion, and the operations further comprise, based on a second defined power criterion being determined to be satisfied, switching the powering of the data center rack from the electrical grid power to an energy storage device. In yet further embodiments, the defined power criterion can be based on a total cost to power the data center rack for a defined period of time.

In various embodiments, the above operations can further comprise, based on the historical power consumption data applicable to the data center rack, generating a recommendation for a reallocation of one or more server resources of one or more servers of the data center rack.

In various embodiments, the above operations can further comprise, using machine learning applied to past energy resources, past energy unit prices, and past energy resource addition costs, generating a recommendation to add an additional energy resource to a group of available energy resources comprising the energy resource.

In various embodiments, the energy resource can be a first energy resource, and the above operations can further comprise, based on the predicted future power consumption of the data center rack and the energy resource data, and based on a defined charge criterion being determined to be satisfied, charging a second energy resource, comprising an energy storage device, using the first energy resource.

In another embodiment, a non-transitory machine-readable medium can comprise executable instructions that, when executed by a processor, facilitate performance of operations, comprising, based on historical power consumption data applicable to a server rack, determining a predicted future power consumption by the server rack, determining energy resource data of an energy resource available for consumption by the server rack, wherein the energy resource data comprises at least one of energy unit cost, energy transfer rate, or usage limit applicable to the energy resource, and based on the predicted future power consumption by the server rack and the energy resource data, and based on a defined power criterion being determined to be satisfied, supplying power to the server rack via the energy resource.

In various embodiments, the energy resource can be among available energy resources available for consumption by the server rack. In further embodiments, the energy resource can comprise an energy storage device. In this regard, the defined power criterion can be evaluated based on at least a state of charge of the energy storage device.

In various embodiments, the above operations can further comprise, using machine learning applied to past energy resources and past energy unit prices, determining the defined power criterion.

In yet another embodiment, a method can comprise, based on an output from a machine learning model trained based on historical power consumption data applicable to a data rack, determining, by a system comprising a processor, a predicted future power consumption by the data rack, determining, by the system, energy resource data of an energy resource available for consumption by the data rack, wherein the energy resource data comprises energy unit cost, energy transfer rate, and usage limit applicable to the energy resource, and based on the predicted future power consumption by the data rack and the energy resource data, and based on a defined power criterion being determined to be satisfied, electrically connecting, by the system, the data rack to the energy resource.

In various embodiments, the energy resource can comprise electrical grid power, and the method can further comprise, based on a power shaving criterion being determined to be satisfied, switching, by the system, electrical connection of the data rack from the electrical grid power to an energy storage device.

In various embodiments, the above method can further comprise, based on the historical power consumption data applicable to the data rack, generating, by the system, a recommendation for a reallocation of a server resource of a server of the data rack.

Embodiments herein can determine from which source to charge an energy storage device (ESD). Such sources can comprise grid (e.g., wall power) or a renewable energy source (e.g., solar, wind, etc.) This determination can be based on, for instance, current charge level of the ESD, when the energy in the ESD is predicted or determined to be needed (e.g., when peak power is needed), how long a charge from each renewable energy source takes, time of day (e.g., power grid may be an optimal recharge source during off-peak hours due to lower costs), or other suitable factors. Embodiments herein can utilize defined processes to make decisions regarding when to recharge an ESD, and from which energy resource. Factors such as climate and/or seasonal changes can be considered (e.g., less sun in winter, wind status, low electricity production from waves, etc.). Thus, embodiments herein can comprise and/or be communicatively and/or electrically coupled to various renewable energy production instrumentation, for instance, in order to make optimal powering and/or charging decisions.

Embodiments herein can reduce overall operating costs, for instance, by using alternatives to grid power during peak operating hours. In various embodiments, each data center rack herein can be connected to both wall power and a local ESD (e.g., a battery). Embodiments herein can continuously collect power consumption statistics from data center rack(s) herein, for instance, to enable prediction of future power consumption rates of the data center racks and/or corresponding servers, or other suitable equipment. Embodiments herein can predict power needed by the data center rack(s), and can make a financial-based decision using a defined process to determine whether to use wall power or ESD. For example, at night, power rates may be low, so a system herein can choose to use wall power and let the ESD charge further.

Turning now to FIG. 1, there is illustrated an example, non-limiting system 102 in accordance with one or more embodiments herein. System 102 can comprise a computerized tool, which can be configured to perform various operations relating to local power storage automation. The system 102 can comprise one or more of a variety of components, such as memory 104, processor 106, bus 108, power consumption component 110, energy resource component 112, and/or power control component 114. In various embodiments, the system 102 can be communicatively or electrically coupled to, or can further comprise, data center rack 116 and/or energy resources 118. In various embodiments, one or more of the memory 104, processor 106, bus 108, power consumption component 110, energy resource component 112, power control component 114, data center rack 116, and/or energy resources 118 can be communicatively or operably coupled (e.g., over a bus or wireless network) to one another to perform one or more functions of the system 102.

According to an embodiment, the power consumption component 110 can, based on historical power consumption data applicable to a data center rack 116 (e.g., a server rack or a data rack), determine a predicted future power consumption by the data center rack 116. In this regard, historical power consumption data applicable to a data center rack 116 can be stored by the power consumption component in the memory 104. In various embodiments, the power consumption component 110 can utilize one or more suitable defined data analysis and forecasting techniques in order to determine the predicted future power consumption by the data center rack 116. Such power consumption can be determined, for instance, by the power consumption component 110, on a per-component-basis of the data center rack 116 (e.g., of respective servers or other components of the data center rack 116). In some embodiments, a machine learning based model generated using machine learning (later discussed in greater detail) applied to the historical power consumption data can be utilized by the power consumption component 110 in order to determine the predicted future power consumption by the data center rack 116. Such historical power consumption data can comprise time of day, day, location, season, climate or weather, kWh consumed, peak load, load factor, demand response, power factor, energy intensity, or other suitable historical power consumption data.

According to an embodiment, the energy resource component 112 can determine energy resource data of an energy resource (e.g., of the energy resources 118) available for consumption by the data center rack 116. In this regard, the energy resource data can comprise energy unit cost, energy transfer rate, and/or a usage limit applicable to the energy resource (e.g., of the energy resources 118). Further, the above noted energy resource can be among a specified group of energy resources 118 available for consumption by the data center rack 116. In some embodiments, the energy resource can comprise an ESD 122. In various embodiments, such an ESD 122 can comprise one or more of a battery, flywheel, pumped hydro storage, compressed air energy storage (CAES), thermal energy storage, supercapacitor, hydrogen storage, or another suitable ESD 122. In this regard, the above noted defined power criterion can comprise a state of charge of the ESD 122 (e.g., a battery) or a state of the energy storage of the ESD 122, depending on the type of ESD 122. For example, if it is two hours before higher energy prices from grid power 124 commence, and solar energy is not available because it is nighttime, and wind energy is available but is not above a defined threshold output, then the power control component 114 can charge the ESD 122 via grid power 124, since it comprises greater output than wind power and can charge the ESD before more expensive electrical grid pricing commences. In this regard, the system 102 can predict future consumption rates, and can make financial-based decisions regarding how to approach all these energy resources 118 and/or storage devices 122. In some embodiments, a machine learning based model generated using machine learning (later discussed in greater detail) applied to historical energy resource data can be utilized by the energy resource component 112 in order to determine predicted future energy resource data comprising energy resource availability, predicted energy resource pricing, or other suitable energy resource data.

In various embodiments, the energy resources 118 can further comprise renewable energy resources 120 (e.g., onsite renewable energy resources that are at a facility or location common to the data center rack 116). Such renewable energy resources 120 can comprise one or more of solar energy, wind energy, hydropower, biomass, geothermal energy, tidal energy, wave energy, ocean thermal energy conversion (OTEC), or other suitable renewable energy resources. In this regard, the grid power 124 can comprise one or more of a variety of energy resources, renewable and/or non-renewable, which can be provided by an energy utility via electric power transmission lines to a facility or location comprising the data center rack 116.

According to an embodiment, the power control component 114 can, based on the predicted future power consumption by the data center rack 116 and the energy resource data, and based on a defined power criterion being determined to be satisfied, power the data center rack 116 via the energy resource. In various embodiments, the above noted defined power criterion can be based on a total cost to power the data center rack 116 for a defined period of time. For example, the defined power criterion can comprise a threshold total cost to power the data center rack 116 for a defined period of time being determined (e.g., by the power control component 114) to be satisfied. In some embodiments, an energy resource herein can comprise a renewable energy resource 120. In further embodiments, an energy resource herein can comprise electrical grid power 124. In this regard, it is noted that the above noted defined power criterion can comprise a first defined power criterion. Further in this regard, the power control component 114 can, based on a second defined power criterion being determined (e.g., by the power control component 114) to be satisfied, switch the powering of the data center rack 116 from the electrical grid power 124 to an ESD 122. For example, the first defined power criterion can comprise a threshold total cost to power the data center rack 116 for a defined period of time being satisfied. While powering the data center rack 116 via the first energy resource, a second defined power criterion (e.g., a lower total cost to power the data center rack 116 for the defined period of time) can be determined by the power control component 114 to be satisfied. Thus, to save energy on energy consumption costs, the power control component 114 can switch the data center rack from consuming energy via a first energy resource to a second energy resource. It is noted that the first and second defined power criteria can comprise other suitable criteria, and are not solely limited to being based on energy cost. Other criteria can comprise defined preferences, green energy ratings, energy availability, associated carbon output, or other suitable criteria.

In various embodiments, the above noted energy resource can be a first energy resource. In this regard, the power control component 114 can, based on the predicted future power consumption of the data center rack 116 and the energy resource data, and based on a defined charge criterion being determined to be satisfied, charge a second energy resource, comprising an ESD 122, using the first energy resource. In this regard, the power control component 114 can determine when to recharge an ESD, and from which energy resource. Factors such as climate and/or seasonal changes can be considered by the power control component 114 (e.g., less sun in winter, wind status, low electricity production from waves, etc.). It is noted that the power control component 114 can be communicatively and/or electrically coupled to various renewable energy production instrumentation, for instance, in order to make optimal powering and/or charging decisions. For example, defined charge criterion herein can comprise a threshold cost to charge the ESD 122 being determined to be satisfied. Other defined charge criteria can comprise a charge level of the ESD 122, time of day, predicted power demand of the data center rack 116, predicted future energy resource availability, an associated system operation status, or other suitable charge criteria.

Figure 2:
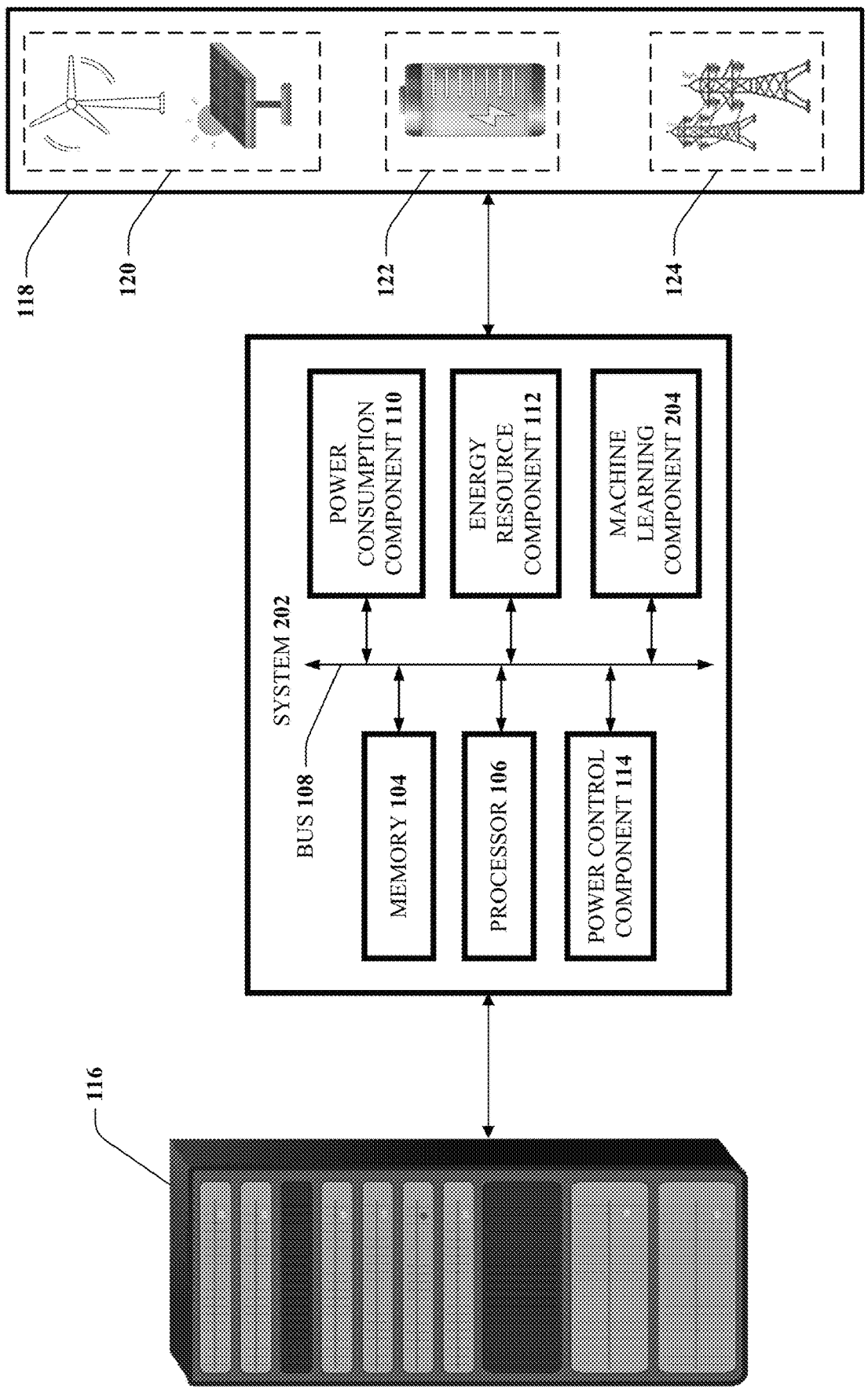
FIG. 2 is a block diagram of an exemplary system in accordance with one or more embodiments described herein.

Turning now to FIG. 2, there is illustrated an example, non-limiting system 202 in accordance with one or more embodiments herein. System 202 can comprise a computerized tool, which can be configured to perform various operations relating to local power storage automation. The system 202 can be similar to system 102, and can comprise one or more of a variety of components, such as memory 104, processor 106, bus 108, power consumption component 110, energy resource component 112, and/or power control component 114. In various embodiments, the system 202 can be communicatively or electrically coupled to, or can further comprise, data center rack 116 and/or energy resources 118. The system 202 can further comprise a machine learning (ML) component 204. In various embodiments, one or more of the memory 104, processor 106, bus 108, power consumption component 110, energy resource component 112, power control component 114, data center rack 116, energy resources 118, and/or ML component 204 can be communicatively or operably coupled (e.g., over a bus or wireless network) to one another to perform one or more functions of the system 202.

In various embodiments, the ML component 204 can, using machine learning applied to past energy resources and past energy unit prices, determine the above noted defined power criterion. In this regard, the ML component 204 can generate a machine learning based model using machine learning applied to historical energy resource data in order to determine the above noted defined power criterion. As previously discussed, this defined power criterion can be utilized by the power control component 114 in order to determine which energy resource to utilize to power the data center rack 116, and when.

In various embodiments, the ML component 204 can, using machine learning applied to past energy resources, past energy unit prices, and past energy resource addition costs, generate a recommendation to add an additional energy resource to a group of available energy resources (e.g., energy resources 118) comprising the energy resource. For example, if a customer entity is a high-demand customer entity (e.g., a factory) (e.g., according to a defined high-demand energy criterion), then some electric companies charge a high-consumption fee, regardless of actual use. Avoiding this fee can be desirable. In this regard, the ML component 204 can generate a resource addition model which can be utilized to generate recommendations for installing new energy resources (e.g., at a facility comprising a data center rack 116). This resource addition model can consider the cost to construct the energy resource and the cost savings to be realized by bringing such an energy resource online. In various embodiments, the recommended energy resource can comprise a new instance of a renewable resource 120.

Various embodiments herein can employ artificial-intelligence or machine learning systems and techniques to facilitate learning user behavior, context-based scenarios, preferences, etc. in order to facilitate taking automated action with high degrees of confidence. Utility-based analysis can be utilized to factor benefit of taking an action against cost of taking an incorrect action. Probabilistic or statistical-based analyses can be employed in connection with the foregoing and/or the following.

It is noted that systems and/or associated controllers, servers, or machine learning components herein can comprise artificial intelligence component(s) which can employ an artificial intelligence (A.I.) model and/or M.L. or an M.L. model that can learn to perform the above or below described functions (e.g., via training using historical training data and/or feedback data).

In some embodiments, ML component 204 can comprise an A.I. and/or M.L. model that can be trained (e.g., via supervised and/or unsupervised techniques) to perform the above or below-described functions using historical training data comprising various context conditions that correspond to various augmented network optimization operations. In this example, such an A.I. and/or M.L. model can further learn (e.g., via supervised and/or unsupervised techniques) to perform the above or below-described functions using training data comprising feedback data, where such feedback data can be collected and/or stored (e.g., in memory) by the ML component 204. In this example, such feedback data can comprise the various instructions described above/below that can be input, for instance, to a system herein, over time in response to observed/stored context-based information.

A.I./M.L. components herein can initiate an operation(s) associated with a based on a defined level of confidence determined using information (e.g., feedback data). For example, based on learning to perform such functions described above using feedback data, performance information, and/or past performance information herein, a ML component 204 herein can initiate an operation associated with determining various thresholds herein (e.g., a motion pattern thresholds, input pattern thresholds, similarity thresholds, authentication signal thresholds, audio frequency thresholds, or other suitable thresholds).

In an embodiment, the ML component 204 can perform a utility-based analysis that factors cost of initiating the above-described operations versus benefit. In this embodiment, the ML component 204 can use one or more additional context conditions to determine various thresholds herein.

To facilitate the above-described functions, a ML component 204 herein can perform classifications, correlations, inferences, and/or expressions associated with principles of artificial intelligence. For instance, the ML component 204 can employ an automatic classification system and/or an automatic classification. In one example, the ML component 204 can employ a probabilistic and/or statistical-based analysis (e.g., factoring into the analysis utilities and costs) to learn and/or generate inferences. The ML component 204 can employ any suitable machine-learning based techniques, statistical-based techniques and/or probabilistic-based techniques. For example, the ML component 204 can employ expert systems, fuzzy logic, support vector machines (SVMs), Hidden Markov Models (HMMs), greedy search processes, rule-based systems, Bayesian models (e.g., Bayesian networks), neural networks, other non-linear training techniques, data fusion, utility-based analytical systems, systems employing Bayesian models, and/or the like. In another example, the ML component 204 can perform a set of machine-learning computations. For instance, the ML component 204 can perform a set of clustering machine learning computations, a set of logistic regression machine learning computations, a set of decision tree machine learning computations, a set of random forest machine learning computations, a set of regression tree machine learning computations, a set of least square machine learning computations, a set of instance-based machine learning computations, a set of regression machine learning computations, a set of support vector regression machine learning computations, a set of k-means machine learning computations, a set of spectral clustering machine learning computations, a set of rule learning machine learning computations, a set of Bayesian machine learning computations, a set of deep Boltzmann machine computations, a set of deep belief network computations, and/or a set of different machine learning computations.

Figure 3:
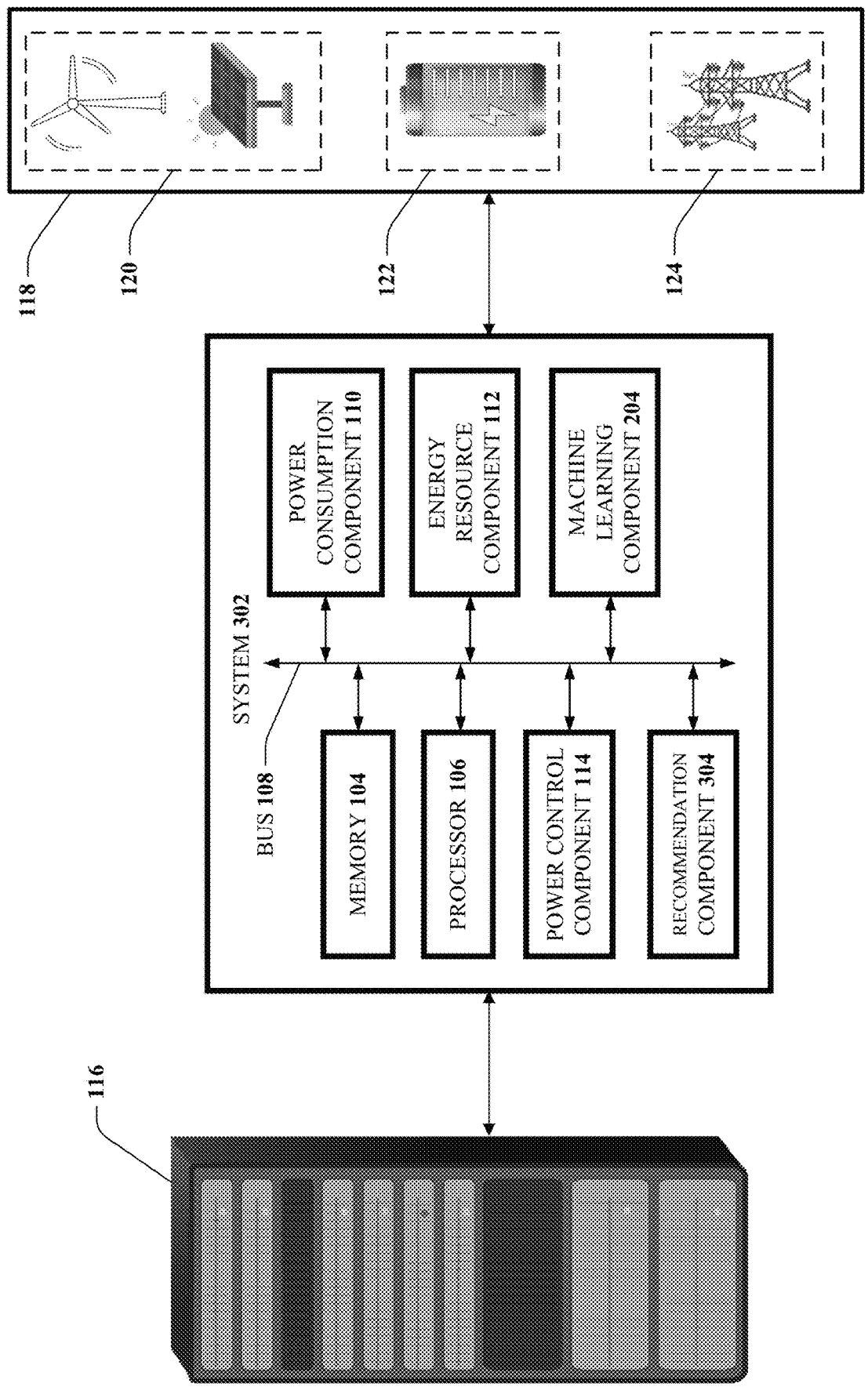
FIG. 3 is a block diagram of an exemplary system in accordance with one or more embodiments described herein.

Turning now to FIG. 3, there is illustrated an example, non-limiting system 302 in accordance with one or more embodiments herein. System 302 can comprise a computerized tool, which can be configured to perform various operations relating to local power storage automation. The system 302 can be similar to system 202, and can comprise one or more of a variety of components, such as memory 104, processor 106, bus 108, power consumption component 110, energy resource component 112, power control component 114, and/or ML component 204. In various embodiments, the system 302 can be communicatively or electrically coupled to, or can further comprise, data center rack 116 and/or energy resources 118. The system 302 can further comprise a recommendation component 304. In various embodiments, one or more of the memory 104, processor 106, bus 108, power consumption component 110, energy resource component 112, power control component 114, data center rack 116, energy resources 118, ML component 204, and/or recommendation component 304 can be communicatively or operably coupled (e.g., over a bus or wireless network) to one another to perform one or more functions of the system 302.

In various embodiments, the recommendation component 304 can, based on historical power consumption data applicable to the data center rack 116, generate a recommendation for a reallocation of one or more server resources of one or more servers of the data center rack 116. For example, a data center rack 116 can comprise a plurality of servers. The data center rack 116 can provide power to such servers. In this regard, the power supply for one data center rack 116 powers multiple servers. The power consumption component 110 can determine how much energy the data center rack 116 is consuming, as well as how much energy each individual server in that data center rack 116 is consuming. For instance, if a data center rack 116 comprises twenty servers that consume above a defined threshold level of energy, representative of significant energy use, and a second data center rack consumes significantly less energy (e.g., a threshold difference), the recommendation component 304 can generate a recommendation to redistribute the servers among the second data center rack, or across a larger group of data center racks (e.g., group of twenty data center racks) so that the twenty high energy usage severs can be distributed among servers of lower consumption.

In another example, if a customer entity is a high-demand customer entity (e.g., a factory), then some electric companies charge a high-consumption fee regardless of actual use. Avoiding this fee can thus be desirable. In this regard, the recommendation component 304 can, based on a cost-analysis, generate a recommendation to install an on-site wind turbine, for instance, in order to lower overall consumption from electric grid 124 and drop consumption below the high-demand customer threshold. In one or more embodiments, the recommendation component 304 can utilize the resource addition model generated by the ML component 204 in order to generate the recommendation to install an additional energy resource, such as a new instance of a renewable resource 120.

Figure 4:
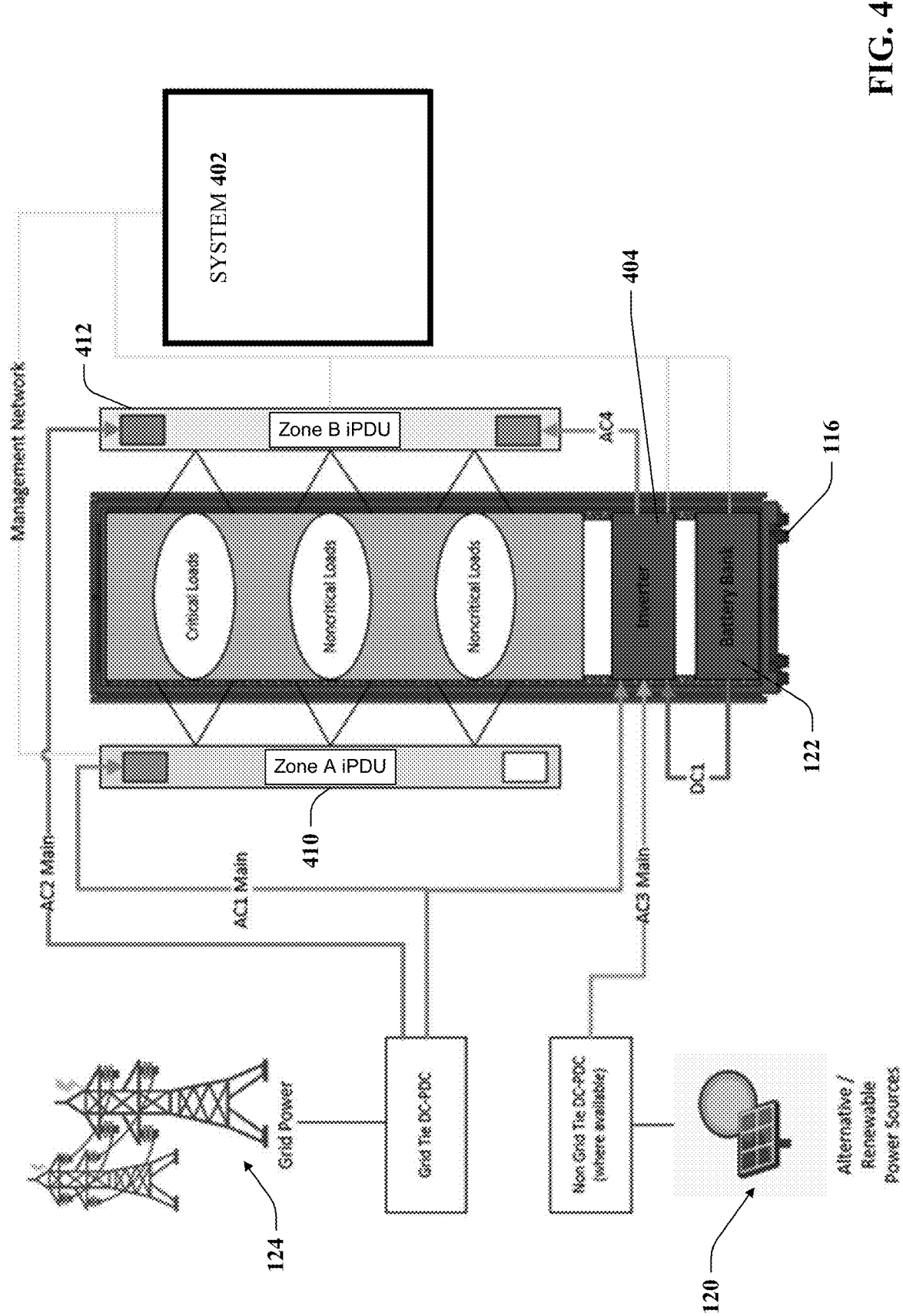
FIG. 4 is a block diagram of an exemplary system in accordance with one or more embodiments described herein.

FIG. 4 illustrates a block diagram of an exemplary system 402 in accordance with one or more embodiments described herein. System 402 can comprise a computerized tool, which can be configured to perform various operations relating to local power storage automation. The system 402 can be similar to system 302, and can comprise one or more of a variety of like components. Repetitive description of like elements or components employed in other embodiments described herein is omitted for sake of brevity.

In various embodiments, the data center rack 116 can comprise two distinct power distribution units (PDUs) (e.g., iPDU 410 and/or iPDU 412), which enable redundant power zones within the data center rack 116 (e.g., zone A and zone B). Each of the rack PDUs can be fed its power from a unique grid tied AC main bus (e.g., AC1 or AC2). Should a failure occur with one AC main, the other AC main can provide power to supply the loads required by the servers, switches, and storage systems within the data center rack 116.

In various embodiments, the data center rack 116 can comprise redundant power supplies in which one power supply can be fed its power from zone A PDU 410, while the other can be supplied power from zone B PDU 412. Each power supply can be configured to power 100% of component load individually. In various embodiments, the data center rack 116 can comprise redundant power supplies in an "N+1" configuration, in which one power supply provides the power to the data center rack 116 while the other power supply is in a "hot" standby mode—fully ready to draw at 100% of its capacity. This can ensure there is no lag period for the standby power supply to supply the full load to the data center rack 116 if, for instance, one of the power supplies fails or an AC main to the data center rack 116 goes offline. In this regard, having power supplies in hot standby can enable high availability of the system 402 and/or data center rack 116.

Embodiments herein can be configured to power shave energy consumption, for instance, by placing limits on the amount of grid power 124 consumed by the data center rack 116 during peak periods, with any additional power requirements beyond the limits drawn from the energy stored in the batteries 122 and/or from other renewable resources 120, such as onsite solar and wind power generation. Embodiments herein can be configured to sell back surplus rack power from the batteries 122 back to the utilities (e.g., grid power 124), for instance, during off peak hours. This sell back can enable data centers to dramatically reduce their overall monthly utility bills, and move towards a net zero building infrastructure.

In addition to the battery bank 122, inverter 404, and intelligent power distribution unit (iPDU)s 410 and 412, the data center rack 116 can be controlled by intelligent orchestration software over a dedicated management network (e.g., via the system 402). Using orchestration software and suitable interfaces, a user entity can designate critical and/or non-critical loads, and automate the functionality of the data center rack 116 by controlling its various modes of operation. It is noted that the system 402 can operate in one or more of a variety of modes. In various embodiments, grid priority mode (GP Mode) can be a default operation mode for the data center rack 116. In this mode, the main power to the data center rack 116 can be sourced from the grid power 124. The grid-tied AC1 and AC2 power mains can supply power to the racks Zone A iPDU (AC1) and Zone B iPDU (AC2), which can distribute the power to the components (e.g., servers) in the data center rack 116. In some embodiments, the inverter 404 does not send power to the data center rack 116 Zone B iPDU (AC2) from the battery bank 122 or from renewable resources (AC3 if available) through the AC4 connection. In various embodiments, the system 402 and/or inverter 404 can keep track of the battery 122 voltage levels while the system is in GP Mode. In some embodiments, the inverter 404 can relay the charge information back to the system 402 (e.g., over a management network). Battery 122 charging can occur in GP Mode, for instance, if the battery voltage falls below a defined RCStart voltage level. In this regard, the inverter 404 can start a new charge cycle, sending current to the battery bank 122 through its DC1 connection. The inverter 404 can draw power for the charging cycle from either AC1 main and/or from alternative AC3 renewable resources, if present. The GP Mode charging operation can continue, for instance, until the battery bank reaches a defined RCStop voltage level.

In various embodiments, the system 402 can remain in GP Mode, for instance, until the amount of amperage being pulled by Zone A iPDU (AC1) from the AC1 main exceeds the value set by the defined PSStartAmps parameter. At this point, the system 402 can enter a power shave mode (PS Mode). The PS Mode can utilize the power stored in the battery bank 122, for instance, to provide surplus power to offset grid power 124 demand, for instance, when grid power demand exceeds a defined limit. When active, PS Mode can, in various embodiments, shave 50% or more of the grid power 124 consumed by the loads in the data center rack 116.

In various embodiments, if the battery voltage level is determined (e.g., via the energy resource component 112 or power control component 114) to fall to the defined RCStart voltage level while in PSMode, a charging cycle can begin (e.g., as initiated via the power control component 114), for instance, if the AC3 main is active and present. The inverter 404 can use power from the AC3 main to charge the batteries 122, concurrently, while the batteries 122 supply power to the Zone B iPDU (AC2). The charging operation can continue until the batteries 122 reach the defined RCStop voltage. If the AC3 main is not present and the battery bank 122 reaches the defined RCStart voltage level, then the system 402 can exit out of PSMode and re-enter GP Mode.

Sell back (SB) mode can enable a customer entity with an onsite alternative/renewable power resources 120 to generate enough electricity to reduce consumption from the grid 124, or even have excess energy available to sell back to the utility grid 124. SB mode can run concurrently with the system 402 in GP mode, as any excess DC power can be converted to AC by the inverter 404 and provided back to the grid 124, for instance, through the AC1 connection. Any incoming power from the alternative energy source AC3 can also be exported back through the inverters AC1 connection. In various embodiments, SB mode can continue exporting power to the grid until either:

1. Sell Back Voltage (SBVolts) level is reached; or
2. The Max Sell Back Amperage (MaxSBAmps) is reached.

Once either of these parameters is reached, SB mode operations can discontinue. The system 402 can monitor and/or log how much energy is exported back to the grid from the inverter 404. In various embodiments, SB Mode can significantly reduce the data center rack 116 power consumption. The ability to Sell Back energy will promote a data center's ability to reach a net zero energy building (NZEB) infrastructure, in which the amount of energy consumed equals, or is exceeded by, the amount of energy produced.

In various embodiments, the data center rack 116 can provide short term back up power for events such as maintenance windows, in which both AC1 and AC2 power mains are offline (e.g., for a brief period of time). In the event in which both AC1 and AC2 are taken offline, and access to AC3 power is available, the system 402 can enter (e.g., via the power control component 114) AC3 Pass Through Mode. In this mode, the inverter 404 can pass through the AC3 power directly to the Zone B iPDU (AC2) (e.g., via the AC4 connection). This operation can provide power to the component power supplies in Zone B of the rack during the maintenance period in which both AC1 and AC2 mains are offline. In various embodiments, the system can enter into AC3 Pass Through mode when both of the following occur:

1. Alerts are received by the management software from both the Zone A (AC1) and Zone B (AC2) iPDUs that grid power has been lost; and
2. An alert from the inverter is received by the management software that AC1 main power has been lost.

The system 402 can exit AC3 Pass through mode when one of the following events occur:

1. When AC Main Power is restored to either Zone A or Zone B iPDU; or
2. When the defined BUTimer expires which will place the system will go into Back Up Mode.

Once in backup mode, the inverter 404 can supply AC power to Zone B iPDU through the AC4 connection by converting DC power from the batteries 122.

Figure 5:
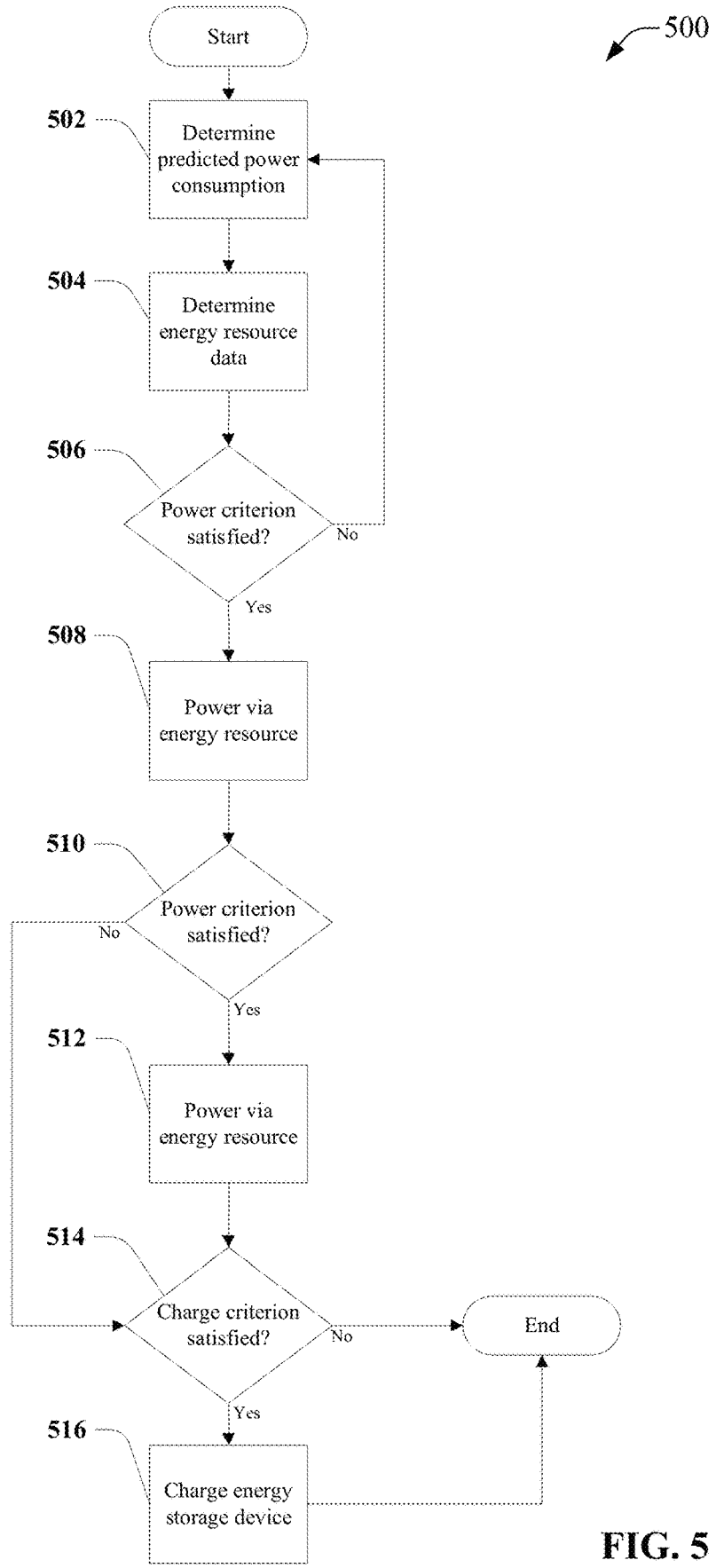
FIG. 5 is a flowchart for a process associated with local power storage automation in accordance with one or more embodiments described herein.

FIG. 5 is a flowchart for a process 500 associated with local power storage automation in accordance with one or more embodiments described herein. At 502, a predicted future power consumption by the data center rack 116 can be determined (e.g., based on historical power consumption data applicable to a data center rack) (e.g., via the power consumption component 110). Such historical power consumption data can comprise time of day, day, location, season, climate or weather, kWh consumed, peak load, load factor, demand response, power factor, energy intensity, or other suitable historical power consumption data. At 504, energy resource data of an energy resource available for consumption by the data center rack 116 can be determined (e.g., via the energy resource component 112). It is noted that the energy resource data can comprise energy unit cost, energy transfer rate, and usage limit applicable to the energy resource (e.g., of the energy resources 118). At 506, if a defined power criterion is satisfied (YES at 506) (e.g., as determined via the power control component 114), the process can proceed to 508. If at 506, the defined power criterion is not satisfied (NO at 506) the process can return to 502. At 508, the data center rack 116 can be powered via a first energy resource (e.g., based on the predicted future power consumption by the data center rack and the energy resource data, and based on a defined power criterion being determined to be satisfied) (e.g., as controlled via the power control component 114). At 510, if a second defined power criterion is satisfied (YES at 510) (e.g., as determined via the power control component 114), the process can proceed to 512. If at 506, the defined power criterion is not satisfied (NO at 510) the process can proceed to 514. At 512, the data center rack 116 can be powered via a second energy resource (e.g., other than the first energy resource) (e.g., as controlled via the power control component 114). At 514, if a defined charge criterion is satisfied (YES at 514) (e.g., as determined via the power control component 114), the process can proceed to 516. If at 514, the defined charge criterion is not satisfied (NO at 514) the process can end. At 516, the second energy resource (e.g., an energy storage device 122) can be charged using the first energy resource (e.g., as controlled via the power control component 114).

Figure 6:
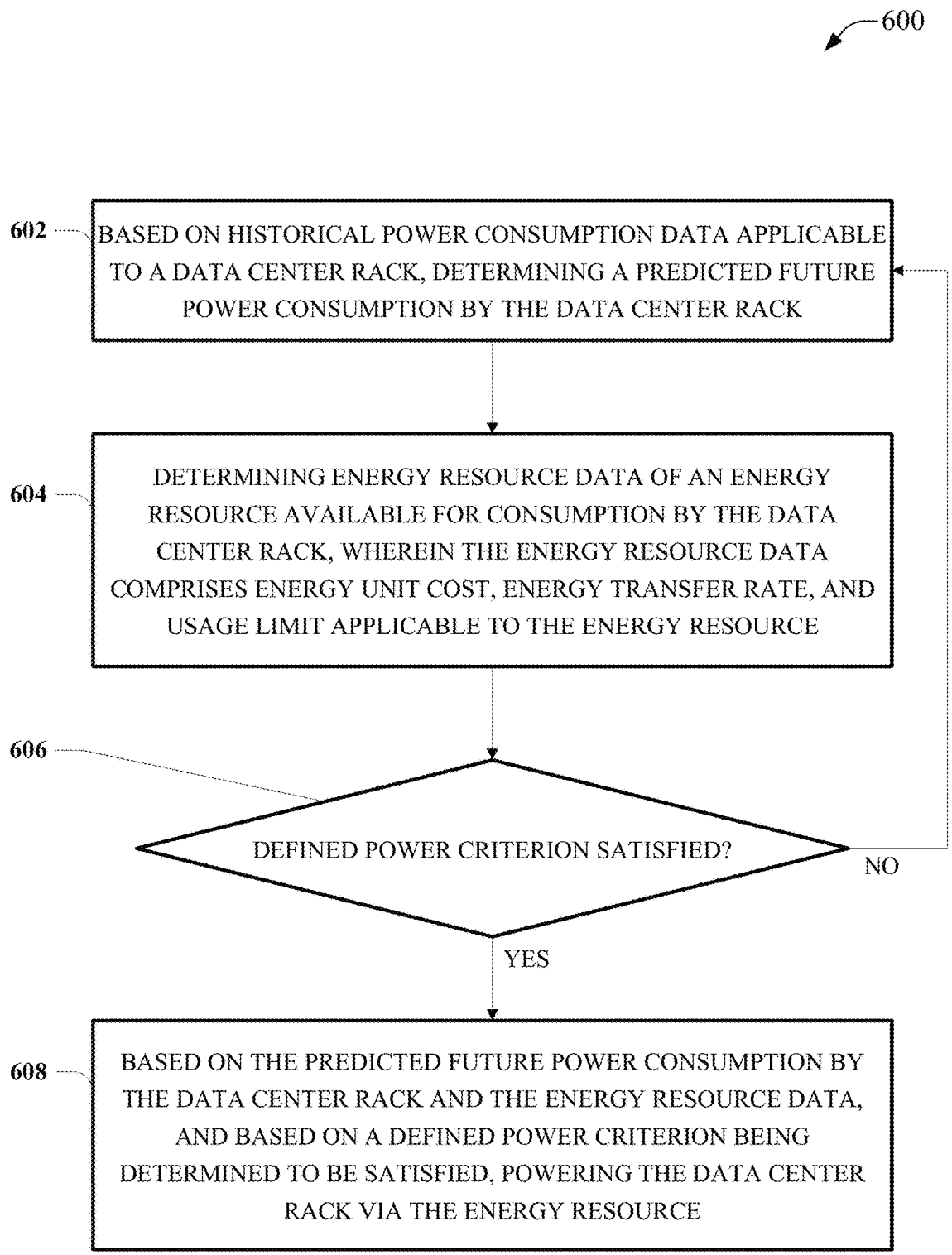
FIG. 6 is a block flow diagram for a process associated with local power storage automation in accordance with one or more embodiments described herein.

FIG. 6 illustrates a block flow diagram for a process 600 associated with local power storage automation in accordance with one or more embodiments described herein. At 602, the process 600 can comprise, based on historical power consumption data applicable to a data center rack, determining (e.g., via a power consumption component 110) a predicted future power consumption by the data center rack 116. At 604, the process 600 can comprise determining (e.g., via the energy resource component 112) energy resource data of an energy resource available for consumption by the data center rack 116, wherein the energy resource data comprises energy unit cost, energy transfer rate, and usage limit applicable to the energy resource (e.g., of the energy resources 118). At 606, if a defined power criterion is satisfied (YES at 606) (e.g., as determined via the power control component 114), the process can proceed to 608. If at 606, the defined power criterion is not satisfied (NO at 606) the process can return to 602. At 608, the process 600 can comprise, based on the predicted (e.g., via the power control component 114) future power consumption by the data center rack and the energy resource data, and based on a defined power criterion being determined (e.g., via the power control component 114) to be satisfied, powering (e.g., via the power control component 114) the data center rack 116 via the energy resource (e.g., of the energy resources 118).

Figure 7:
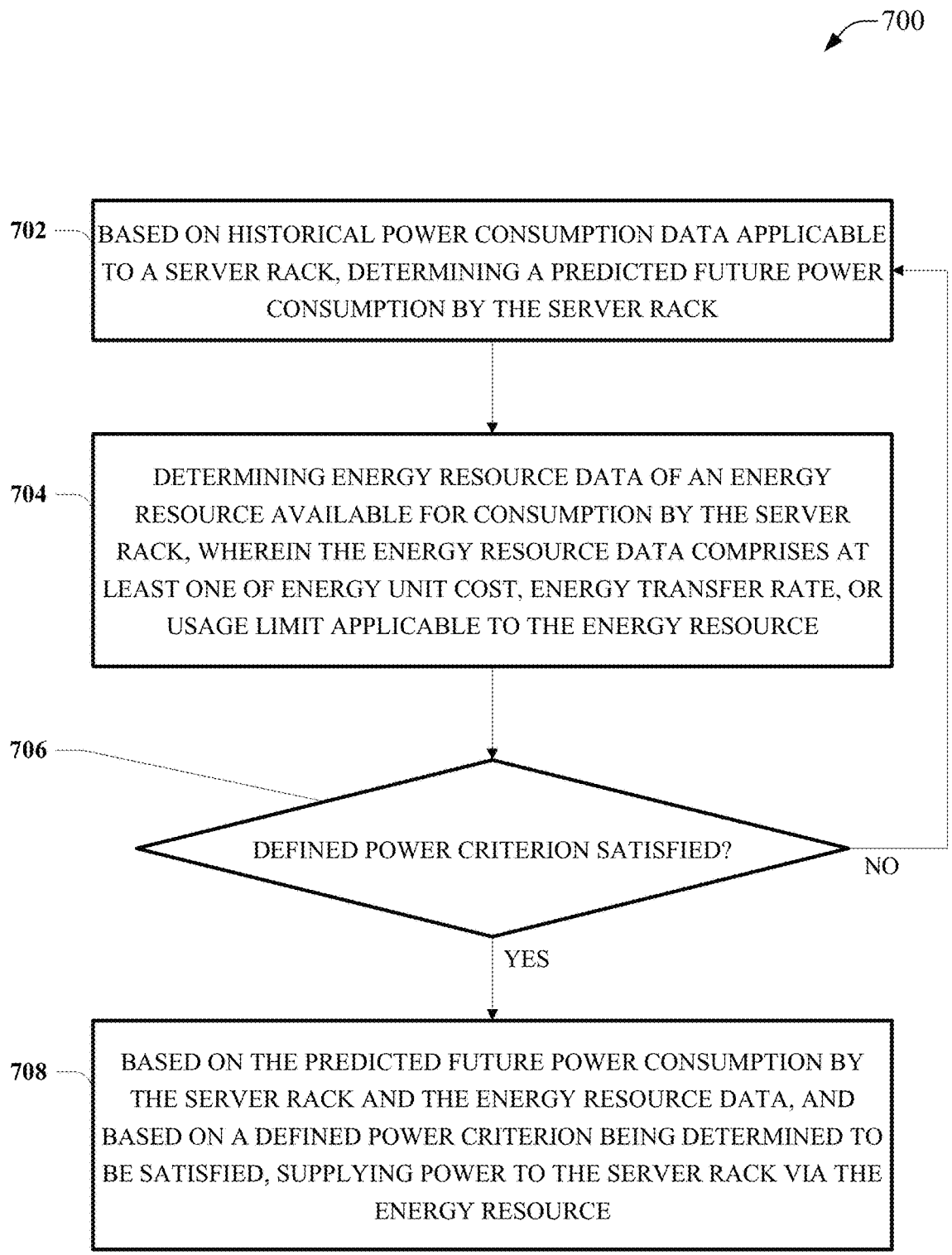
FIG. 7 is a block flow diagram for a process associated with local power storage automation in accordance with one or more embodiments described herein.

FIG. 7 illustrates a block flow diagram for a process 700 associated with local power storage automation in accordance with one or more embodiments described herein. At 702, the process 700 can comprise, based on historical power consumption data applicable to a server rack (e.g., data center rack 116), determining (e.g., via the power consumption component 110) a predicted future power consumption by the server rack (e.g., data center rack 116). At 704, the process 700 can comprise determining (e.g., via the energy resource component 112) energy resource data of an energy resource (e.g., of the energy resources 118) available for consumption by the server rack (e.g., data center rack 116), wherein the energy resource data comprises at least one of energy unit cost, energy transfer rate, or usage limit applicable to the energy resource. At 706, if a defined power criterion is satisfied (YES at 706) (e.g., as determined via the power control component 114), the process can proceed to 708. If at 706, the defined power criterion is not satisfied (NO at 706) the process can return to 702. At 708, the process 700 can comprise, based on the predicted (e.g., via the power control component 114) future power consumption by the server rack and the energy resource data, and based on a defined power criterion being determined (e.g., via the power control component 114) to be satisfied, supplying (e.g., via the power control component 114) power to the server rack via the energy resource (e.g., of the energy resources 118).

Figure 8:
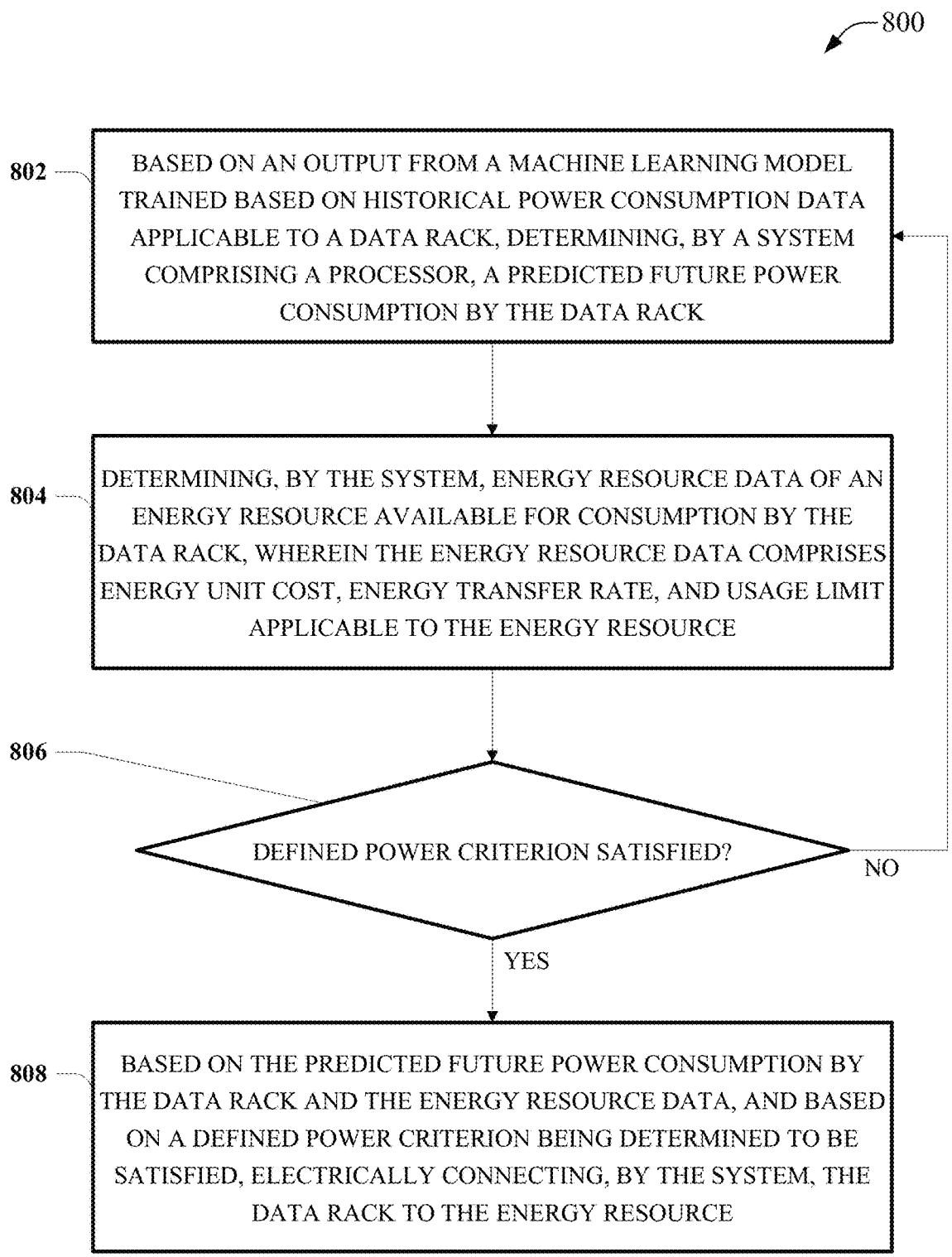
FIG. 8 is a block flow diagram for a process associated with local power storage automation in accordance with one or more embodiments described herein.

FIG. 8 illustrates a block flow diagram for a process 800 associated with local power storage automation in accordance with one or more embodiments described herein. At 802, the process 800 can comprise, based on an output from a machine learning model (e.g., as generated via the ML component 204) trained based on historical power consumption data applicable to a data rack (e.g., data center rack 116), determining, by a system comprising a processor (e.g., via the power consumption component 110), a predicted future power consumption by the data rack (e.g., data center rack 116). At 804, the process 800 can comprise determining, by the system (e.g., via the energy resource component 112), energy resource data of an energy resource (e.g., of the energy resources 118) available for consumption by the data rack (e.g., data center rack 116), wherein the energy resource data comprises energy unit cost, energy transfer rate, and usage limit applicable to the energy resource. At 806, if a defined power criterion is satisfied (YES at 806) (e.g., as determined via the power control component 114), the process can proceed to 808. If at 806, the defined power criterion is not satisfied (NO at 806) the process can return to 802. At 808, the process 800 can comprise, based on the predicted (e.g., via the power control component 114) future power consumption by the data rack and the energy resource data, and based on a defined power criterion being determined (e.g., via the power control component 114) to be satisfied, electrically connecting, by the system (e.g., via the power control component 114), the data rack (e.g., data center rack 116) to the energy resource (e.g., of the energy resources 118).

Figure 9:
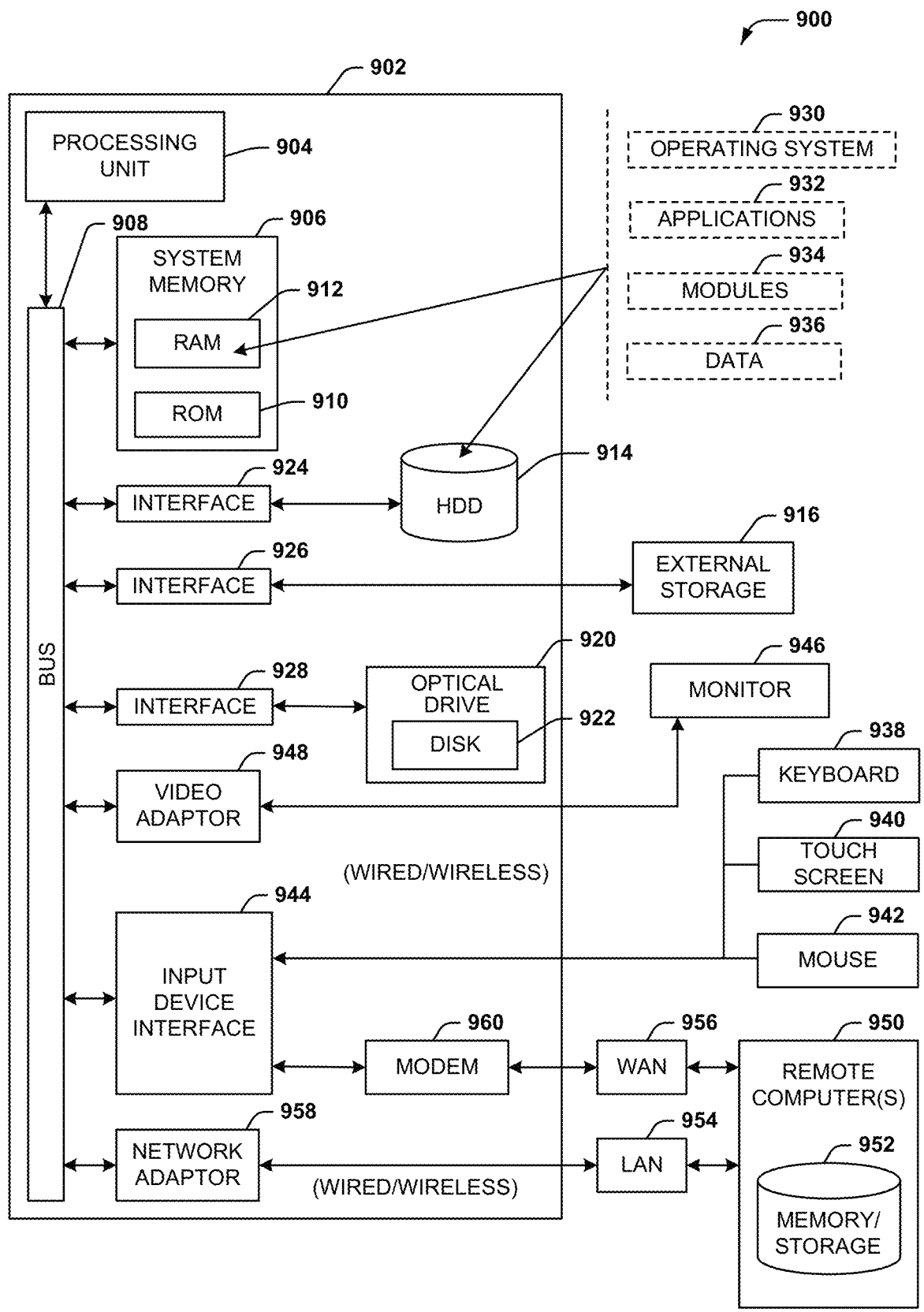
FIG. 9 is an example, non-limiting computing environment in which one or more embodiments described herein can be implemented.

In order to provide additional context for various embodiments described herein, FIG. 9 and the following discussion are intended to provide a brief, general description of a suitable computing environment 900 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data, or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory, or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries, or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared, and other wireless media.

With reference again to FIG. 9, the example environment 900 for implementing various embodiments of the aspects described herein includes a computer 902, the computer 902 including a processing unit 904, a system memory 906 and a system bus 908. The system bus 908 couples system components including, but not limited to, the system memory 906 to the processing unit 904. The processing unit 904 can be any of various commercially available processors. Dual microprocessors and other multi-processor architectures can also be employed as the processing unit 904.

The system bus 908 can be any of several types of bus structure that can further interconnect to a memory bus (with or without a memory controller), a peripheral bus, and a local bus using any of a variety of commercially available bus architectures. The system memory 906 includes ROM 910 and RAM 912. A basic input/output system (BIOS) can be stored in a non-volatile memory such as ROM, erasable programmable read only memory (EPROM), EEPROM, which BIOS contains the basic routines that help to transfer information between elements within the computer 902, such as during startup. The RAM 912 can also include a high-speed RAM such as static RAM for caching data.

The computer 902 further includes an internal hard disk drive (HDD) 914 (e.g., EIDE, SATA), one or more external storage devices 916 (e.g., a magnetic floppy disk drive (FDD) 916, a memory stick or flash drive reader, a memory card reader, etc.) and an optical disk drive 920 (e.g., which can read or write from a disk 922, such as a CD-ROM disc, a DVD, a BD, etc.). While the internal HDD 914 is illustrated as located within the computer 902, the internal HDD 914 can also be configured for external use in a suitable chassis (not shown). Additionally, while not shown in environment 900, a solid-state drive (SSD) could be used in addition to, or in place of, an HDD 914. The HDD 914, external storage device(s) 916 and optical disk drive 920 can be connected to the system bus 908 by an HDD interface 924, an external storage interface 926 and an optical drive interface 928, respectively. The interface 924 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 902, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 912, including an operating system 930, one or more application programs 932, other program modules 934 and program data 936. All or portions of the operating system, applications, modules, and/or data can also be cached in the RAM 912. The systems and methods described herein can be implemented utilizing various commercially available operating systems or combinations of operating systems.

Computer 902 can optionally comprise emulation technologies. For example, a hypervisor (not shown) or other intermediary can emulate a hardware environment for operating system 930, and the emulated hardware can optionally be different from the hardware illustrated in FIG. 9. In such an embodiment, operating system 930 can comprise one virtual machine (VM) of multiple VMs hosted at computer 902. Furthermore, operating system 930 can provide runtime environments, such as the Java runtime environment or the .NET framework, for applications 932. Runtime environments are consistent execution environments that allow applications 932 to run on any operating system that includes the runtime environment. Similarly, operating system 930 can support containers, and applications 932 can be in the form of containers, which are lightweight, standalone, executable packages of software that include, e.g., code, runtime, system tools, system libraries and settings for an application.

Further, computer 902 can be enabled with a security module, such as a trusted processing module (TPM). For instance, with a TPM, boot components hash next in time boot components, and wait for a match of results to secured values, before loading a next boot component. This process can take place at any layer in the code execution stack of computer 902, e.g., applied at the application execution level or at the operating system (OS) kernel level, thereby enabling security at any level of code execution.

A user can enter commands and information into the computer 902 through one or more wired/wireless input devices, e.g., a keyboard 938, a touch screen 940, and a pointing device, such as a mouse 942. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 904 through an input device interface 944 that can be coupled to the system bus 908, but can be connected by other interfaces, such as a parallel port, an IEEE 1394 serial port, a game port, a USB port, an IR interface, a BLUETOOTH® interface, etc.

A monitor 946 or other type of display device can be also connected to the system bus 908 via an interface, such as a video adapter 948. In addition to the monitor 946, a computer typically includes other peripheral output devices (not shown), such as speakers, printers, etc.

The computer 902 can operate in a networked environment using logical connections via wired and/or wireless communications to one or more remote computers, such as a remote computer(s) 950. The remote computer(s) 950 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 952 is illustrated. The logical connections depicted include wired/wireless connectivity to a local area network (LAN) 954 and/or larger networks, e.g., a wide area network (WAN) 956. Such LAN and WAN networking environments are commonplace in offices and companies, and facilitate enterprise-wide computer networks, such as intranets, all of which can connect to a global communications network, e.g., the Internet.

When used in a LAN networking environment, the computer 902 can be connected to the local network 954 through a wired and/or wireless communication network interface or adapter 958. The adapter 958 can facilitate wired or wireless communication to the LAN 954, which can also include a wireless access point (AP) disposed thereon for communicating with the adapter 958 in a wireless mode.

When used in a WAN networking environment, the computer 902 can include a modem 960 or can be connected to a communications server on the WAN 956 via other means for establishing communications over the WAN 956, such as by way of the Internet. The modem 960, which can be internal or external and a wired or wireless device, can be connected to the system bus 908 via the input device interface 944. In a networked environment, program modules depicted relative to the computer 902 or portions thereof, can be stored in the remote memory/storage device 952. It will be appreciated that the network connections shown are examples and other means of establishing a communications link between the computers can be used.

When used in either a LAN or WAN networking environment, the computer 902 can access cloud storage systems or other network-based storage systems in addition to, or in place of, external storage devices 916 as described above. Generally, a connection between the computer 902 and a cloud storage system can be established over a LAN 954 or WAN 956 e.g., by the adapter 958 or modem 960, respectively. Upon connecting the computer 902 to an associated cloud storage system, the external storage interface 926 can, with the aid of the adapter 958 and/or modem 960, manage storage provided by the cloud storage system as it would other types of external storage. For instance, the external storage interface 926 can be configured to provide access to cloud storage sources as if those sources were physically connected to the computer 902.

The computer 902 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 10:
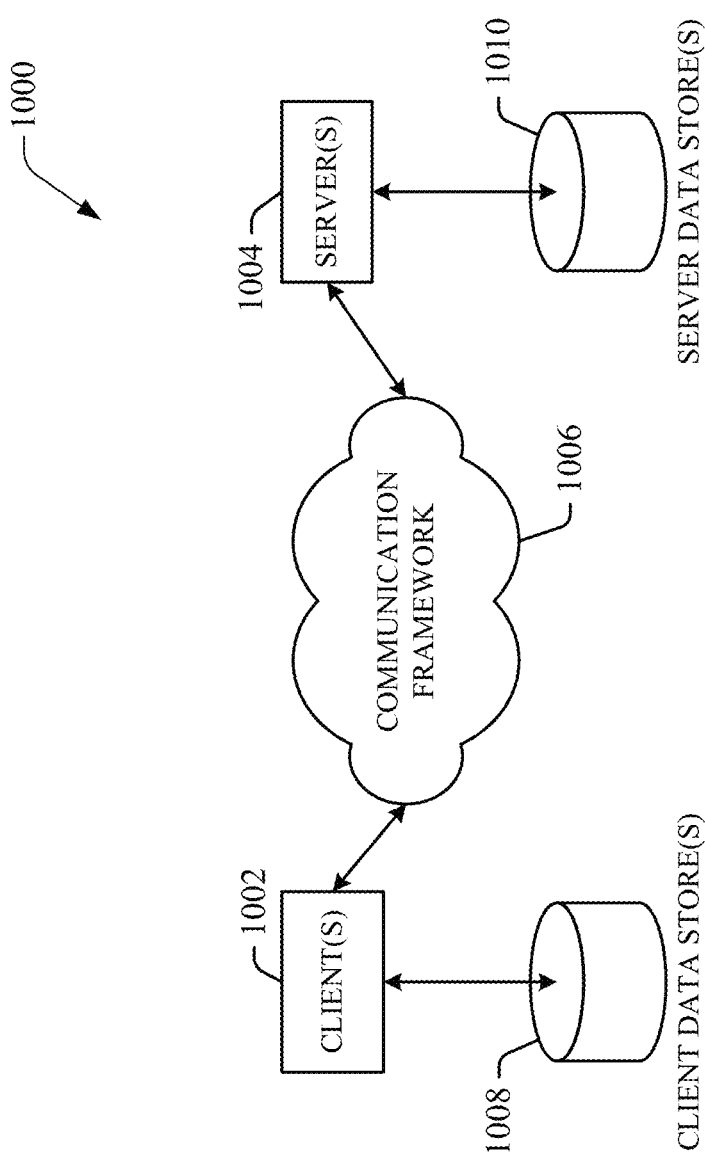
FIG. 10 is an example, non-limiting networking environment in which one or more embodiments described herein can be implemented.

Referring now to FIG. 10, there is illustrated a schematic block diagram of a computing environment 1000 in accordance with this specification. The system 1000 includes one or more client(s) 1002, (e.g., computers, smart phones, tablets, cameras, PDA's). The client(s) 1002 can be hardware and/or software (e.g., threads, processes, computing devices). The client(s) 1002 can house cookie(s) and/or associated contextual information by employing the specification, for example.

The system 1000 also includes one or more server(s) 1004. The server(s) 1004 can also be hardware or hardware in combination with software (e.g., threads, processes, computing devices). The servers 1004 can house threads to perform transformations of media items by employing aspects of this disclosure, for example. One possible communication between a client 1002 and a server 1004 can be in the form of a data packet adapted to be transmitted between two or more computer processes wherein data packets may include coded analyzed headspaces and/or input. The data packet can include a cookie and/or associated contextual information, for example. The system 1000 includes a communication framework 1006 (e.g., a global communication network such as the Internet) that can be employed to facilitate communications between the client(s) 1002 and the server(s) 1004.

Communications can be facilitated via a wired (including optical fiber) and/or wireless technology. The client(s) 1002 are operatively connected to one or more client data store(s) 1008 that can be employed to store information local to the client(s) 1002 (e.g., cookie(s) and/or associated contextual information). Similarly, the server(s) 1004 are operatively connected to one or more server data store(s) 1010 that can be employed to store information local to the servers 1004.

In one exemplary implementation, a client 1002 can transfer an encoded file, (e.g., encoded media item), to server 1004. Server 1004 can store the file, decode the file, or transmit the file to another client 1002. It is noted that a client 1002 can also transfer uncompressed file to a server 1004 and server 1004 can compress the file and/or transform the file in accordance with this disclosure. Likewise, server 1004 can encode information and transmit the information via communication framework 1006 to one or more clients 1002.

The illustrated aspects of the disclosure may also be practiced in distributed computing environments where certain tasks are performed by remote processing devices that are linked through a communications network. In a distributed computing environment, program modules can be located in both local and remote memory storage devices.

The above description includes non-limiting examples of the various embodiments. It is, of course, not possible to describe every conceivable combination of components or methods for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above-described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A system comprising at least one processor, wherein the processor is configured to:
    based on historical power consumption data applicable to a data center rack, determine a predicted future power consumption by the data center rack;
    determine energy resource data of an energy resource available for consumption by the data center rack, wherein the energy resource data comprises energy unit cost, energy transfer rate, and usage limit applicable to the energy resource;
    based on the predicted future power consumption by the data center rack and the energy resource data, and based on a defined power criterion being determined to be satisfied, power the data center rack via the energy resource; and
    based further on the predicted future power consumption, generate, using a resource addition model generated using machine learning based on past resource addition costs and past power consumption, recommendation data representative of a recommendation to install an additional energy resource available to the data center rack.

2. The system of claim 1, wherein the energy resource is among a specified group of energy resources available for consumption by the data center rack.

3. The system of claim 1, wherein the at least one processor is further configured to:
    using machine learning applied to past energy resources and past energy unit prices, determine the defined power criterion.

4. The system of claim 1, wherein the energy resource comprises an energy storage device.

5. The system of claim 4, wherein the defined power criterion comprises a state of charge of the energy storage device.

6. The system of claim 1, wherein the energy resource comprises a renewable energy resource.

7. The system of claim 1, wherein the energy resource comprises electrical grid power.

8. The system of claim 7, wherein the defined power criterion is a first defined power criterion, and wherein the at least one processor is further configured to:
    based on a second defined power criterion being determined to be satisfied, switch the powering of the data center rack from the electrical grid power to an energy storage device.

9. The system of claim 1, wherein the defined power criterion is based on a total cost to power the data center rack for a defined period of time.

10. The system of claim 1, wherein the recommendation data is first recommendation data representative of a first recommendation, and wherein the at least one processor is further configured to:
    based on the historical power consumption data applicable to the data center rack, generate second recommendation data representative of a second recommendation for a reallocation of one or more server resources of one or more servers of the data center rack.

11. The system of claim 1, wherein the recommendation data is first recommendation data representative of a first recommendation, and wherein the at least one processor is further configured to:
    using machine learning applied to past energy resources, past energy unit prices, and past energy resource addition costs, generate second recommendation data representative of a second recommendation to add an additional energy resource to a group of available energy resources comprising the energy resource.

12. The system of claim 1, wherein the energy resource is a first energy resource, and wherein the at least one processor is further configured to:
    based on the predicted future power consumption of the data center rack and the energy resource data, and based on a defined charge criterion being determined to be satisfied, charge a second energy resource, comprising an energy storage device, using the first energy resource.

13. A non-transitory machine-readable medium, comprising executable instructions that, when executed by at least one processor, cause the at least one processor to:
    based on historical power consumption data applicable to a server rack, determine a predicted future power consumption by the server rack;
    determine energy resource data of an energy resource available for consumption by the server rack, wherein the energy resource data comprises at least one of energy unit cost, energy transfer rate, or usage limit applicable to the energy resource;
    based on the predicted future power consumption by the server rack and the energy resource data, and based on a defined power criterion being determined to be satisfied, supply power to the server rack via the energy resource; and
    based further on the predicted future power consumption, generate, using a resource addition model generated using machine learning based on past resource addition costs and past power consumption, a recommendation to install an additional energy resource available to the server rack.

14. The non-transitory machine-readable medium of claim 13, wherein the energy resource is among available energy resources available for consumption by the server rack.

15. The non-transitory machine-readable medium of claim 13, wherein the computer executable instructions further cause the at least one processor to:

using machine learning applied to past energy resources and past energy unit prices, determine the defined power criterion.

16. The non-transitory machine-readable medium of claim 13, wherein the energy resource comprises an energy storage device.

17. The non-transitory machine-readable medium of claim 16, wherein the defined power criterion is evaluated based on at least a state of charge of the energy storage device.

18. A method, comprising:
    based on an output from a machine learning model trained based on historical power consumption data applicable to a data rack, determining, by a system comprising a processor, a predicted future power consumption by the data rack;
    determining, by the system, energy resource data of an energy resource available for consumption by the data rack, wherein the energy resource data comprises energy unit cost, energy transfer rate, and usage limit applicable to the energy resource;
    based on the predicted future power consumption by the data rack and the energy resource data, and based on a defined power criterion being determined to be satisfied, electrically connecting, by the system, the data rack to the energy resource; and
    based further on the predicted future power consumption, generating, by the system using a resource addition model generated using machine learning based on past resource addition costs and past power consumption, a recommendation to install an additional energy resource available to the data rack.

19. The method of claim 18, wherein the energy resource comprising electrical grid power, and wherein the method further comprises:
    based on a power shaving criterion being determined to be satisfied, switching, by the system, electrical connection of the data rack from electrical grid power to an energy storage device.

20. The method of claim 18, further comprising:
    based on the historical power consumption data applicable to the data rack, generating, by the system, a recommendation for a reallocation of a server resource of a server of the data rack.

* * * * *